(12) United States Patent
Ogborne et al.

(10) Patent No.: US 10,051,928 B2
(45) Date of Patent: Aug. 21, 2018

(54) WRIST-WORN DEVICE CLASP

(71) Applicant: ARM IP LIMITED, Cambridge Cambridgeshire (GB)

(72) Inventors: Steven James Ogborne, Cambridge (GB); Hugo John Martin Vincent, Cambridge (GB); Gabor Balint, Pest Megye (HU)

(73) Assignee: ARM IP Limited, Cambridge (GB)

( * ) Notice: Subject to any disclaimer, the term of this patent is extended or adjusted under 35 U.S.C. 154(b) by 303 days.

(21) Appl. No.: 14/913,002

(22) PCT Filed: Aug. 19, 2014

(86) PCT No.: PCT/GB2014/052538
§ 371 (c)(1),
(2) Date: Feb. 19, 2016

(87) PCT Pub. No.: WO2015/025151
PCT Pub. Date: Feb. 26, 2015

(65) Prior Publication Data
US 2016/0198816 A1    Jul. 14, 2016

(30) Foreign Application Priority Data

Aug. 19, 2013 (GB) .................................. 1314751.7

(51) Int. Cl.
*A44C 5/14* (2006.01)
*H01F 7/00* (2006.01)
(Continued)

(52) U.S. Cl.
CPC .............. *A44C 5/14* (2013.01); *A44C 5/2066* (2013.01); *G01D 5/142* (2013.01);
(Continued)

(58) Field of Classification Search
CPC ......... A44C 5/14; A44C 5/147; A44C 5/2066; A44C 5/185; A44C 9/0075; A44D 2203/00; G04B 37/1486; H01F 7/0263; G07C 9/00
(Continued)

(56) References Cited

U.S. PATENT DOCUMENTS 6,695,207 B1   2/2004  Norris, Jr.
7,496,994 B1   3/2009  Headley
(Continued)

FOREIGN PATENT DOCUMENTS

DE           3736254 A1    5/1989
DE       102005021978 A    11/2006
(Continued)

OTHER PUBLICATIONS

Search Report dated Sep. 20, 2017 for GB Application No. 1713853.8, 4 pages.
(Continued)

*Primary Examiner* — Jack W Lavinder
(74) *Attorney, Agent, or Firm* — Patterson Thuente Pedersen, P.A.

(57) ABSTRACT

A wrist-worn device clasp that secures a strap of the wrist-worn device. A first mechanical part of the wrist worn device interlocks with a second mechanical part by motion in a first plane in order to resist motion perpendicular to said first plane. The first mechanical part also inhibits a first securing part and a second securing part being separated by tension along the strap substantially perpendicular to the first plane when the first mechanical part and second mechanical part are engaged with each other. The first securing part and the second securing part inhibit separation of the first mechanical part and the second mechanical part by motion parallel to the first plane when they are engaged with each other by motion perpendicular to the first plane.

7 Claims, 10 Drawing Sheets

(51) Int. Cl.

| | |
|---|---|
| *G01D 5/14* | (2006.01) |
| *A44C 5/20* | (2006.01) |
| *H01F 7/02* | (2006.01) |
| *G07C 9/00* | (2006.01) |
| *G04B 37/14* | (2006.01) |
| *G06F 21/34* | (2013.01) |
| *G06F 21/88* | (2013.01) |

(52) U.S. Cl.
CPC ......... *G04B 37/1486* (2013.01); *G06F 21/34* (2013.01); *G06F 21/88* (2013.01); *G07C 9/00* (2013.01); *H01F 7/0263* (2013.01); *A44D 2203/00* (2013.01)

(58) Field of Classification Search
USPC .................................. 24/303; 368/281, 282
See application file for complete search history.

(56) References Cited

U.S. PATENT DOCUMENTS

| | | | | |
|---|---|---|---|---|
| 9,581,972 B1* | 2/2017 | Arrow | .................. | H01M 10/46 |
| 9,609,921 B1* | 4/2017 | Feinstein | .............. | A44C 5/2071 |
| 2003/0103414 A1 | 6/2003 | Lyon | | |
| 2003/0229974 A1 | 12/2003 | Zemer et al. | | |
| 2014/0191830 A1* | 7/2014 | Fullerton | .............. | H01F 7/0205 |
| | | | | 335/301 |
| 2015/0115870 A1* | 4/2015 | Vance | .................. | H02J 7/0042 |
| | | | | 320/101 |

FOREIGN PATENT DOCUMENTS

| | | |
|---|---|---|
| DE | 102008020764 A | 10/2009 |
| GB | 2482931 A | 2/2012 |
| JP | H10 179219 A | 7/1998 |

OTHER PUBLICATIONS

Office Action dated Jun. 1, 2017 for GB Application No. 1314751.7, 4 pages.
Search Report dated Feb. 19, 2014 for GB Application No. 1314751.7, 1 page.
Search Report dated Jun. 13, 2014 for GB Application No. 1314751.7, 1 page.
International Search Report for PCT/GB2014/052538, dated Feb. 4, 2015, 6 pages.
PCT Written Opinion of the International Searching Authoriy for PCT/GB2014/052538, dated Feb. 4, 2015, 11 pages.

* cited by examiner

WRIST-WORN DEVICE CLASP

RELATED APPLICATIONS

The present application is a National Phase entry of PCT Application No. PCT/GB2014/052538, filed Aug. 19, 2014, which claims priority from GB Patent Application No. 1314751.7, filed Aug. 19, 2013, said applications being hereby incorporated by reference herein in their entirety.

TECHNICAL FIELD

The present invention relates to the field of wrist-worn devices. In particular, the present invention has relevance to wrist-worn device clasps as may be used, for example, on a watch.

BACKGROUND OF THE INVENTION

Wrist-worn devices are typically secured to the person's wrist by means of a strap and clasp. When the clasp is in an unclosed state, the strap is open and/or sufficiently large or deformable such that it can be made to extend over a user's hand onto a user's wrist. A clasp is then used to limit the slack of the strap or to prevent deformation of the strap, thereby preventing the strap from passing back over the user's hand and thereby being removed. The wrist-worn device can be removed from the user by operating the clasp (by releasing it), thereby opening the strap and/or restoring the slack or deformable capability of the strap and once again allowing the strap of the wrist-worn device to pass over the user's hand. It may be desirable to determine when such a clasp has been released, indicating that the wrist-worn device has been or is about to be removed. Attempts to detect such clasp releases by means of measuring a conductivity or resistivity of the clasp or strap can be frustrated by environmental conditions, such as precipitation, and may also be deliberately overcome by, for example, shorting the detection circuitry. Degradation of the clasp or strap may also yield such measurements useless. For example, a degraded strap may never register as being closed or secure. Furthermore, it may be necessary to make the clasp or strap out of particular materials or to use a very precise (and therefore expensive) manufacturing processes in order to make the clasp and or strap suitable for use with these techniques.

A variety of clasp mechanisms are well known in the prior art. Typically, these mechanisms involve a trade-off between security and usability. For example, if the clasp is easy to operate then there is a risk that the clasp will accidentally be released while the wrist-worn device is being worn by a user, causing it to fall off. Conversely, if the clasp is more difficult to operate then it will be more secure. However, the clasp may be more time consuming or frustrating for a user to release when the user actively wishes to remove the wrist-worn device.

SUMMARY OF THE INVENTION

According to one aspect there is provided a wrist-worn device clasp configured to detect whether or not a first side and a second side of a clasp are connected, the clasp comprising: a magnetic securing mechanism comprising a first magnetic source on the first to side and a second magnetic source on the second side, wherein the first magnetic source and second magnetic source are configured to engage with each other via a magnetic force and wherein opposing regions of the first magnetic source and the second magnetic source are opposite in magnetic polarity; a third magnetic source on the second side; a magnetic sensor on the first side and proximal to the magnetic securing mechanism, configured to engage with and detect whether a magnetic field of the third magnetic source at the magnetic sensor is above a threshold; a first field-controlling body having a high permeability and located on the first side, configured to channel a magnetic field of the first magnetic source such that a magnetic field of the first magnetic source at the magnetic sensor is below the threshold; and a second field-controlling body having a high permeability and located on the second side, configured to channel a magnetic field of the second magnetic source such that a magnetic field of the second magnetic source at the magnetic sensor is below the threshold.

In accordance with the above aspect it is possible to secure a wrist-worn device using a magnetic securing mechanism. The magnetic securing mechanism includes a first magnetic source on a first side of a clasp and a second magnetic source on a second side of the clasp. The first and second magnetic sources are configured to engage with each other as a result of a magnetic force. Furthermore, when the first and second magnetic sources engage with each other, opposing regions of the sources are opposite in magnetic polarity. Accordingly, the first magnetic source and second magnetic source are magnetically attracted to each other and hence are used to secure the clasp. A third magnetic source and a magnetic sensor are also provided for determining whether the clasp is open or closed. The magnetic sensor is proximal to the magnetic securing mechanism and determines whether the clasp is open or closed based on whether a magnetic field of a third magnetic source at the sensor is above a threshold. The threshold may be selected such that the third magnetic source and magnetic sensor may move slightly, relative to each other, in order to allow for movement of the clasp or the wrist-worn device, but such that the removal of the clasp by separating the first side and second side of the clasp will cause the magnetic field of the third magnetic source and magnetic sensor to fall below the threshold and thereby for it to be determined that the clasp has been opened.

In this aspect, the magnetic sensor is proximal to the magnetic securing mechanism. Accordingly, in order to prevent interference from the magnetic securing mechanism with the magnetic sensor, for example, by having the magnetic sensor detect the magnetic field of the magnetic securing mechanism rather than the magnetic field of the third magnetic source, first and second field controlling bodies are provided. The field controlling bodies have a high permeability and are located on each of the first side and second side of the clasp. Accordingly, the field controlling bodies each channel magnetic fields of the first and second magnetic sources such that magnetic fields of the first and second magnetic sources at the magnetic sensor are below the threshold. Accordingly, the field controlling bodies reduce the interference of the magnetic securing mechanism at the magnetic sensor and thereby prevent the magnetic sensor from being affected by the magnetic securing mechanism.

Consequently, the above aspect is able to provide a magnetic securing mechanism in close proximity to a magnetic field detector that determines whether the clasp has been opened or not.

The magnetic sensor may be a Hall effect sensor. The advantage of using such a sensor is low power consumption and that a static magnetic field can be detected and there is no need for the magnetic field of the third magnetic source to be varied in order that it is detected.

At least one of the first field controlling body and second field controlling body may comprise a ferromagnetic material. For example, such a material may comprise steel.

In some embodiments, there is provided a wrist-worn device comprising the wrist-worn device clasp, wherein responsive to the magnetic sensor detecting that the magnetic field of the third magnetic source at the magnetic sensor is below a threshold, the wrist-worn device is configured to switch an authentication state of the wrist-worn device.

In some embodiments, the authentication state is switched from an authenticated state to an unauthenticated state, or the authentication state is switched from an unauthenticated state to an authenticated state.

According to a second aspect of the invention, there is provided a method of detecting whether or not a first side and a second side of a clasp for a wrist-worn device are connected, the clasp comprising: a first engaging step of engaging a first magnetic source on the first side and a second magnetic source on the second side via a magnetic force, wherein opposing regions of the first magnetic source and the second magnetic source are opposite in magnetic polarity; a second engaging step of engaging a magnetic sensor on the first side, proximal to the second magnetic source, with a third magnetic source on the second side; a detection step of detecting whether or not a magnetic field of the third magnetic source at the magnetic sensor is above a threshold; a first channelling step of channelling a magnetic field of the first to magnetic source such that a magnetic field of the first magnetic source at the magnetic sensor is below the threshold; and a second channelling step of channelling a magnetic field of the second magnetic source such that a magnetic field of the second magnetic source at the magnetic sensor is below the threshold.

According to a third aspect of the invention there is provided a wrist-worn device clasp configured to detect whether or not a first side and a second side of a clasp are connected, the clasp comprising: a magnetic securing means for securing via a magnetic force, the magnetic securing means comprising a first magnetic means for providing a first magnetic field and a second magnetic means for providing a second magnetic field, wherein the first magnetic means is on the first side and the second magnetic means is on the second side and wherein the first magnetic means and second magnetic means are configured to engage with each other via the magnetic force and wherein opposing regions of the first magnetic means and the second magnetic means are opposite in magnetic polarity; a third magnetic means for providing a third magnetic field, wherein the third magnetic means is on the second side; a magnetic sensing means for engaging with and detecting whether a magnetic field of the third magnetic source at the magnetic sensor is above a threshold, wherein the magnetic sensing means is on the first side proximal to the magnetic securing mechanism; a first field-controlling means for channelling a magnetic field of the first magnetic source such that the magnetic field of the first magnetic source at the magnetic sensor is below the threshold, wherein the first field-controlling means is on the first side; and a second field-controlling means for channelling a magnetic field of the second magnetic source such that the magnetic field of the second magnetic source at the magnetic sensor is below the threshold, wherein the second field-controlling means is on the second side.

In another aspect there is provided a wrist worn device comprising a device body and a strap secured by a clasp configured to secure the device to a user's wrist, the strap includes a magnetic sensor configured to detect whether the clasp is in a closed state or an open state.

The clasp may, in some embodiments, be formed with one side as part of the device body and the other part of the strap. The part on the device body may include the sensor and the part on the strap a permanent magnet.

According to a fourth aspect, there is provided a wrist-worn device clasp having a first side and a second side, configured to secure a strap, the wrist-worn device clasp comprising: a mechanical interlocking mechanism comprising a first mechanical part on the first side and a second mechanical part on the second side, the first mechanical part being configured to interlock with the second mechanical part by motion in a first plane to resist motion perpendicular to the first plane and inhibit a first securing part and a second securing part being separated by tension along the strap substantially perpendicular to the first plane when the first mechanical part and second mechanical part are engaged with each other; and a securing mechanism comprising the first securing part on the first side and the second securing part on the second side, wherein the first securing part and the second securing part are configured, when engaged with each other by motion perpendicular to the first plane, to inhibit separation of the first mechanical part and the second mechanical part by motion parallel to the first plane.

The mechanical interlocking mechanism and the securing mechanism each prevent the release of the clasp by inhibiting motion or separation in a different plane. In particular, the mechanical interlocking mechanism and the securing mechanism each engage in planes that are perpendicular to each other, while each of the mechanical interlocking mechanism and the securing mechanism inhibits separation of the clasp in a plane that is perpendicular to the plane of the engagement of that mechanism. Accordingly, a synergistic effect is achieved in which each of the mechanical interlocking mechanism and the securing mechanism inhibits the other mechanism from being disengaged, resulting in a highly secure clasp. It may therefore be possible for each of the interlocking mechanism and the securing mechanism to be simple, thereby making the clasp both secure and relatively easy to intentionally remove.

Each of the mechanical interlocking mechanism and the securing mechanism comprises two parts, with each having a first part on a first side of the clasp and a second part on the second side of the clasp. The clasp is done up by engaging the first and second parts of both the mechanical interlocking mechanism and the securing mechanism. Similarly, the clasp is undone by disengaging both parts of the mechanical interlocking mechanism and the securing mechanism.

In this fourth aspect, the first securing part and the second securing part are engaged with each other by a motion perpendicular to the first plane. However, it will be appreciated that it may be necessary, particularly in view of the inhibition of movement caused by the mechanical interlocking mechanism, for such perpendicular motion to occur before the mechanical interlocking mechanism is engaged. Hence, the engagement of the first securing part and the second securing part may require motion in multiple planes to occur. For example, such engagement may require motion parallel to the first plane followed by motion perpendicular to the first plane before the securing mechanism is fully engaged.

The securing mechanism may additionally inhibit separation of the first securing part and the second securing part.

That is, the securing mechanism may be such that the first securing part and the second securing part form a secure connection when engaged.

Accordingly, there may be provided two separate mechanisms each of which inhibits the separation of the first side and of the second side of the clasp. The two mechanisms may therefore work in synergy in order to both secure the clasp and to prevent the separation of the other mechanism.

The first securing part and the second securing part may each comprise at least one magnet. Furthermore, the first securing part and the second securing part may be urged together by a magnetic force. The use of magnets in the securing mechanism may be advantageous due to the multidirectional effect of magnetic forces. For example, a magnetic attractive force may be multidirectional, i.e a first magnetic source having a first polarity and a second magnetic source having an opposite polarity will attract each other regardless of the plane in which they are situated, provided that they are sufficiently close. Accordingly, such a clasp has the advantage that the first part of the clasp and the second part of the clasp are urged together, regardless of the planes in which they are located. Hence, the closed clasp will be biased towards a closed position and so will be more difficult to accidentally release.

A further advantage of using magnets for the securing mechanism, is that it may be possible for a user to feel the magnetic force. This can be used as tactile feedback to the user in order to verify that the clasp has been secured. Furthermore, the action of bringing the two parts of the clasp together can result in a "snapping" sound, producing auditory feedback to the user that the clasp has been securely closed.

The first securing part may be located within a first central region of the first mechanical part, wherein the first central region is substantially parallel to the first plane and the second securing part may be located within a second central region of the second mechanical part, wherein the second central region is substantially parallel to the first plane. By placing the magnets in this manner, the magnetic force that urges the first securing part and the second securing part together is located at a center of the first mechanical part and second mechanical part. Accordingly, a user may separate the first securing part and second securing part through a twisting or rotational motion by lifting up one of the sides of the first mechanical part or second mechanical part.

The wrist-worn device clasp may further comprise a cover disposed over the securing mechanism and configured to protect the securing mechanism from exposure. Such a cover may prevent damage to the magnet as a result of extreme temperatures, precipitation, or the accumulation of debris, all of which may lessen the effectiveness of the magnets.

Furthermore, such a cover protects the magnets from damage such as being scraped or eroded away.

One of the first mechanical part and the second mechanical part may be an inner mechanical part, with the other one of the first mechanical part and second mechanical part being an outer mechanical part. That is, the first mechanical part and second mechanical part may consist of an inner mechanical part and an outer mechanical part. The outer mechanical part may comprise at least one channel for receiving part of the inner mechanical part at an entrance point. That is, the inner mechanical part may slide into the outer mechanical part through a channel. Such a means of fastening is easy for a user to accomplish and may be operated with low dexterity. For example, it may be possible for a user to slide the inner mechanical part into the outer mechanical part using a single hand.

The entrance point may be larger than the inner mechanical part and a part of the channel may decrease in size away from the entrance point to a second point in the channel. Accordingly, it is straightforward for a user to line up the inner mechanical part with the outer mechanical part in order to perform the interlock. That is, a user may not need to precisely line up the inner mechanical part and outer mechanical part in order to form the interlock. Instead, it may be possible for a user to line up the inner mechanical part with any part of the much bigger outer mechanical part and, as a result of the shape of the channel, guide the inner mechanical part into the second point of the channel of the outer mechanical part where the interlock is completed.

The second point may be substantially the same size as the inner mechanical part. In particular, the second point may be only slightly larger than the inner mechanical part such that the inner mechanical part is held securely at the second point of the channel. Hence, when the interlock completes after the inner mechanical part reaches the second point of the channel, the interlock between the inner mechanical part and outer mechanical part is secure.

In fact, the part of the at least one channel may continuously decrease in size in a direction away from the entrance point towards the second point. Accordingly, the shape of the channel may automatically guide the inner mechanical part into the second point of the channel where the interlock completes, without the user having to further align the inner mechanical part and outer mechanical part. That is, since the size of part of the at least one channel continuously decreases in size towards the second point, the inner mechanical part is guided directly towards the second point where the interlock completes. The mechanical interlocking mechanism may thereby be easier to use.

The at least one channel may be splayed. For example, a side opening of the at least one channel may widen further away from the wall that defines the channel. Furthermore the first mechanical part and second mechanical part may be configured to be disengaged by rotation in the first plane. Such a rotation in the first plane may be a motion that is unlikely to occur accidentally, while remaining easy for a user to accomplish with low dexterity being required. Accordingly, the user may be able to intentionally undo the clasp quickly while reducing the probability of the clasp being undone accidentally.

At least one part of the clasp may be made from anodized aluminium. Such a material has the advantage that it is relatively robust, resistant to corrosion, and provides a sleek surface in which the first mechanical part and second mechanical part can be smoothly slid together. Accordingly, there is limited resistance when sliding the first mechanical part and second mechanical part together in order to provide the interlock. The interlocking mechanism may therefore operate smoothly and easily for a user.

The first side of the clasp may either be part of the face of a watch, or may be part of the strap. It will be appreciated that since the terms "first side" and "second side" are merely being used as labels, that the second side may also be part of the face of a watch or may be part of the strap in any appropriate combination. A particular advantage of providing the first side as part of the face of a watch, is the removal of any need to provide conductive material through the strap of the watch to sensors, which may be prone to being easily damaged leading to the device becoming unreliable.

According to a fifth aspect there is provided a method of securing a strap of a wrist-worn device by use of a clasp having a first side and a second side, the method comprising the steps of: a mechanical interlocking step of moving a first mechanical part on the first side relative to a second mechanical part on the second side in a first plane in order to interlock the first mechanical part and the second mechanical part and thereby resist motion perpendicular to a first plane and inhibit a first securing part and a second securing part being separated by tension along the strap substantially perpendicular to the first plane when the first mechanical part and second mechanical part are engaged with each other; and a securing step of moving the first securing part on the first side relative to the second securing part on the second side in a plane perpendicular to the first plane, in order to engage the first securing part and the second securing part, to inhibit separation of the first mechanical part and the second mechanical part by motion parallel to the first plane.

According to a sixth aspect there is provided a wrist-worn device clasp having a first side and a second side, configured to secure a strap, the wrist-worn device clasp comprising: a mechanical interlocking means for resisting motion perpendicular to a first plane, the mechanical interlocking means comprising a first mechanical means for performing at least part of a mechanical interlock and a second mechanical means for performing at least part of the mechanical interlock, wherein the first mechanical means is on the first side and the second mechanical means is on the second side, and wherein the mechanical interlock occurs by motion in the first plane; and a securing means for inhibiting separation of the first mechanical means and the second mechanical means by motion parallel to the first plane, the securing means comprising a first securing means for performing at least part of a securement and a second securing means for performing at least part of the securement, wherein the securement occurs when the first securing means and the second securing means are engaged with each other by motion in a plane perpendicular to the first plane, wherein the mechanical interlocking means is configured to inhibit the first securing means and the second securing means being separated by tension along the strap substantially perpendicular to the first plane when the first mechanical means and second mechanical means are engaged with each other.

BRIEF DESCRIPTION OF THE DRAWINGS

Embodiments of the invention will now be described, by way of example only, with reference to the accompanying drawings in which.

DETAILED DESCRIPTION

Figure 1:
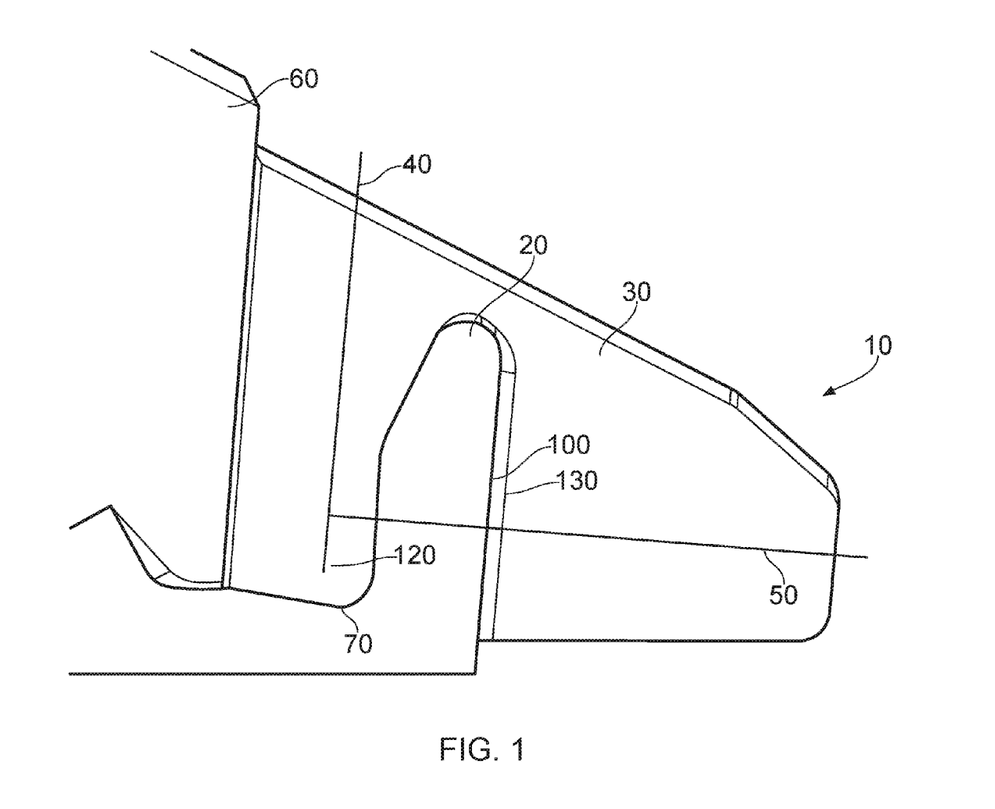
FIG. 1 shows a wrist-worn device clasp in a closed state according to one embodiment.

FIG. 1 shows an example wrist-worn device clasp 10 according to one embodiment in which the clasp is engaged, i.e. secure. In this embodiment, the clasp has two sides; a first side of the clasp is a housing 20 into which a second side of the clasp, which is a buckle 30, is received. In this embodiment, the housing part 20 forms part of a watch 60 and receives the buckle part 30 of the clasp by motion in a first plane 40. This motion causes protrusions 120 of the buckle part of the clasp 30 to slide into channels 70 of the housing part 20 of the clasp 10. Protrusions 120 and channels 70 therefore collectively form a mechanical interlocking mechanism.

The clasp 10 also comprises a securing mechanism comprising magnets. A first set of magnets 100 is provided on the housing part 20 of the clasp 10, while a second set of magnets 130 is provided on the buckle part 30 of the clasp 10. The magnets are positioned such that when the mechanical interlocking mechanism is engaged, as previously discussed, the magnets 100, 130 align with each other. In this embodiment, the first set of magnets 100 is opposite in polarity to the second set of magnets 130. The user may engage the two sets of magnets 100, 130 by firstly moving the housing part 20 and buckle part 30 in a plane 50 substantially perpendicular to the first plane 40. The user may then engage the two sets of magnets 100, 130 at the same time that the mechanical interlocking mechanism is engaged by moving the buckle part 30 in the first plane 40. When the two sets of magnets 100, 130 are close to each other, the magnets will exhibit a magnetic attractive force that may be felt by the user. This has the advantage that the user can feel, through a tactile sensation, that the securing mechanism is engaging. As a result of the magnetic attractive force, in this embodiment, the mechanical interlocking mechanism may also complete itself, causing both the mechanical interlocking mechanism and the securing mechanism to engage simultaneously. Bringing the two sets of magnets 100, 130 together, may be accompanied by an auditory feedback such as a snapping sound. Again, this feedback can help the user confirm that the clasp 10 has been done up securely.

It will be appreciated from FIG. 1 that when the mechanical interlocking system made up from protrusions 120 and channels 70 is engaged, motion in a plane 50 that is substantially perpendicular (i.e. at approximately 90 degrees) to the first plane 40 is resisted. The mechanical interlocking mechanism therefore inhibits separation of the magnets 100, 130. In particular, the mechanical interlocking mechanism inhibits the magnets 100, 130 from being separated when tension is applied along plane 50. Such tension may be caused when, for example, the user wears the strap that the clasp 10 is securing. Furthermore, when the magnets 100, 130 are engaged with each other, they inhibit the separation of the protrusions 120 from the channels 70. That is, the magnets 100, 130 resist motion parallel to the first plane 40. It will therefore be appreciated that these two mechanisms act together in synergy in order to prevent releasing of the clasp 10 when it is secured. In particular, the magnets 100, 130 inhibit separation of the protrusions 120 from the channels 70, which in turn inhibits separation of the magnets 100, 130.

The clasp 10 may be made from any suitable material. In this embodiment, the clasp is made from anodized aluminium in order to inhibit corrosion of the clasp and degradation of the magnets. Furthermore, anodized aluminium may have a lubricated surface, i.e. a surface with low levels of friction. Consequently, it is easier for the user to engage the mechanical interlocking system by sliding the protrusions 120 into the channels 70.

Figure 2:
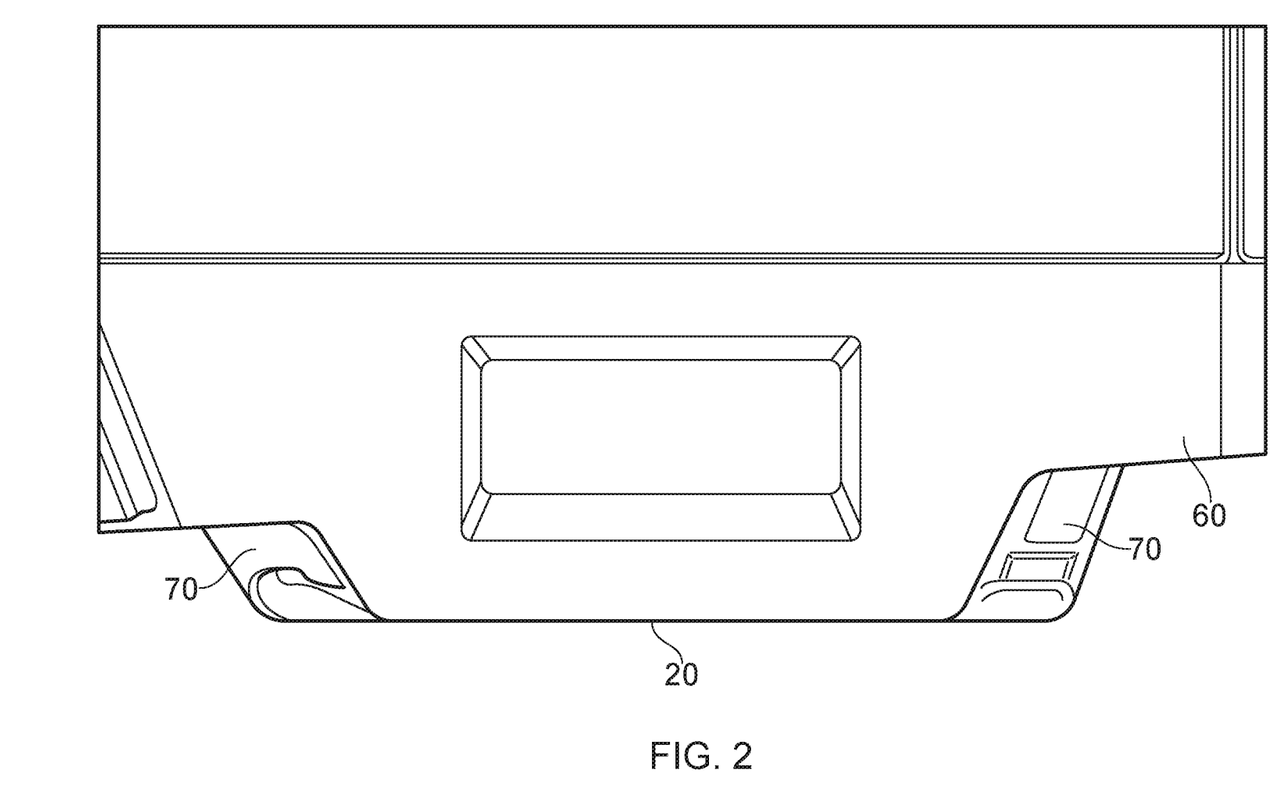
FIG. 2 shows a top-down view of a housing part of the clasp in accordance with one embodiment.

FIG. 2 shows a top-down view of the housing part 20 of the clasp 10 in an unconnected state. This figure clearly shows a shape of the channels 70 of the housing part of the clasp 10. As can be seen, the channels are suitable for receiving the protrusion 120 that forms part of the buckle part 30 of the clasp 10 in order to thereby form a mechanical interlock between the housing part 20 and buckle part 30 of the clasp 10.

Figure 3:
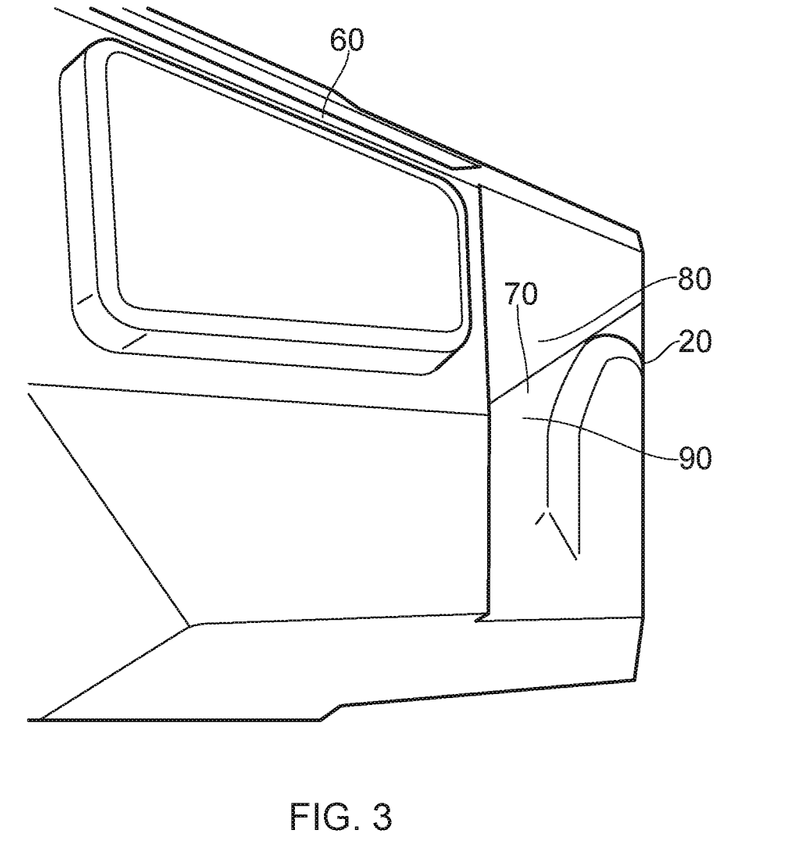
FIG. 3 shows a side view of the housing part shown in FIG. 2.

FIG. 3 shows the housing part 20 of the clasp 10 in a side view.

In this view, it can be seen that each of the channels 70 comprises an entrance point 80. The entrance point 80 of each channel is the widest point of that channel. In particular, each of the channels 70 narrows down to a second point 90. The width of each of the channels 70 at the second point 90 is very slightly larger than the protrusions 120 themselves such that the protrusions can be securely slid into and out of the channels 70 at the second point 90. As a result of the channels 70 having such a shape, it is possible to easily insert the protrusions 120 into the channels 70 and guide them to the second point 90 of the channels 70, where the protrusions 120 are held more securely.

Figure 4:
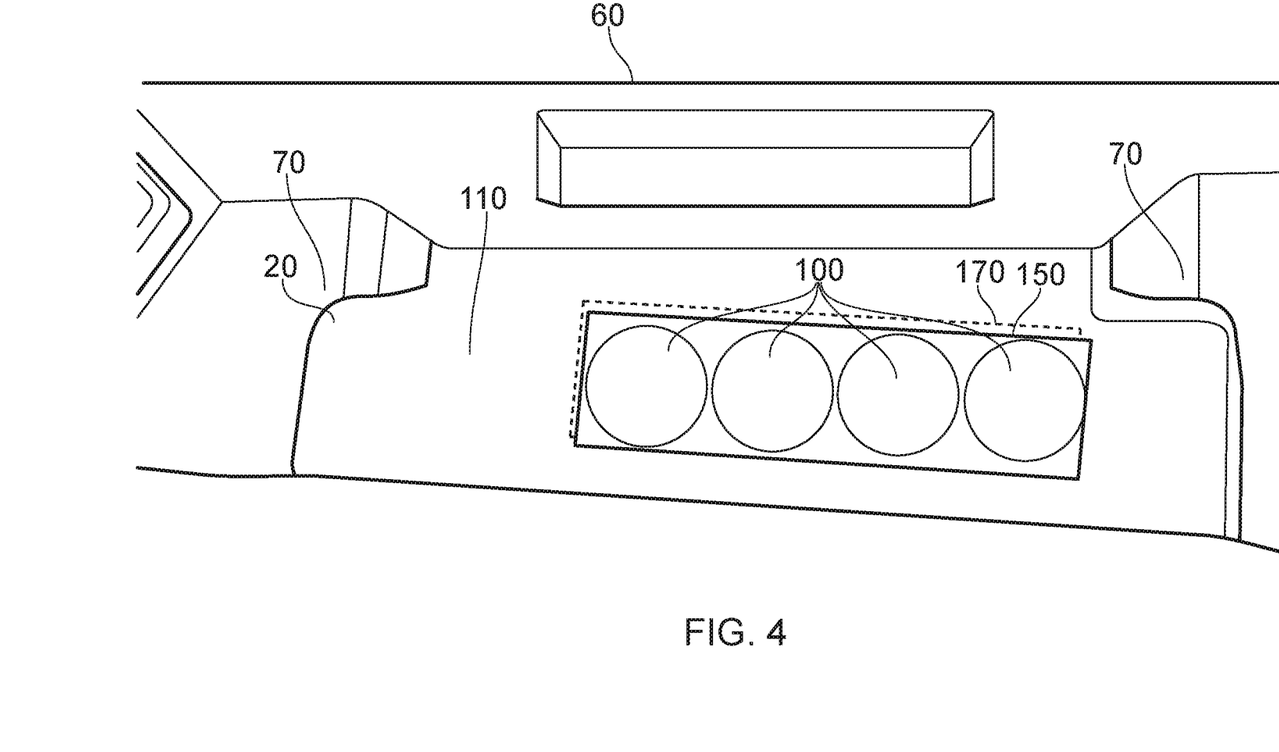
FIG. 4 shows a front view of the housing part shown in FIG. 2.

FIG. 4 shows a view of the housing part 20 of the clasp 10 from a front view.

In this figure, it can be seen that the first set of magnets 100, which form part of the securing mechanism, are included on the housing part 20 of the clasp 10. The first set of magnets 100 is positioned to engage with corresponding magnets on the buckle part 30 of the clasp 10. In this embodiment, the two sets of magnets 100, 130 attract each other and thereby create a secure arrangement in which the two parts 20, 30 of the clasp 10 are held together securely. Each of the magnets 100, 130 may also be protected by a cover 150, which prevents the magnets from being exposed. Consequently, the magnets are less likely to be subject to moisture, debris or other contaminants and are less likely to be scraped or eroded away. The magnetic field produced by the magnets may be less likely to degrade over time, or may degrade at a slower rate. This is advantageous because maintaining the magnetic field of the magnets causes the attractive force between the two sets of magnets 100, 130 to be stronger and therefore produce a more secure engagement.

In this embodiment, the first set of magnets 100 is located on part of the housing part that is used to perform the mechanical interlock. In particular, the first set of magnets 100 is located in the middle of the part of the housing part 20 that is used to achieve the mechanical interlock. For example, the first set of magnets 100 may be located midway between the channels 70. In this way, when the protrusions 120 and channels 70 are engaged with each other and thereby form a mechanical interlock, it is possible for the two parts 20, of the clasp 10 to be disengaged by a rotation of one of the parts in the first plane 40. More particularly, because the attractive force between the magnets 100, 130 is located in the middle of the two parts 20, 30 of the clasp 10, the extremes of the two parts 20, 30 of the clasp 10 are held less securely than in the middle. Consequently, by, for example, performing a twisting motion on the buckle part 30 of the clasp, the two parts 20, 30 of the clasp 10 can be disengaged. This motion may be easy for a user to perform one handed and yet may be unlikely to occur accidentally. Consequently, such a clasp can be easily removed intentionally while being difficult to remove accidentally.

FIG. 4 also shows the location of the magnetic sensor 110, such as a Hall effect sensor. In this example, the magnetic sensor is under the surface of the housing 20, and so only its location is shown. The Hall effect sensor is configured to line up with a third magnetic source 140 of the buckle part 30 (not shown in FIG. 4) of the clasp 10 when the buckle part 30 and housing part 20 are engaged. Accordingly, when the clasp 10 is secure (i.e. fastened or done up), the Hall effect sensor 110 is able to detect the (static) magnetic field of the third magnetic source 140, and thereby determine that the clasp 10 is engaged. The Hall effect sensor 110 can be used to provide release detection, i.e. detect if the clasp has been undone thereby permitting the wrist worn device to be removed from the user's wrist. If the wrist worn device is a trusted device (e.g. used to validate transactions, open doors, provide passwords, etc.) placed in to an authenticated state (unlocked) by a user (e.g. entering a PIN or by biometrics), then the Hall effect sensor 110 can detect if the clasp is opened indicating the device may no longer be securely under control of the original user and thus may trigger a switch out of the authenticated state.

The Hall effect sensor 110 is proximal to the first set of magnets 100 in the housing part 20 of the clasp 10 and also, when the clasp is done up, to the second set of magnets 130 in the buckle part 30 of the clasp 10. Consequently, there is a need to control the magnetic fields of the magnets 100, 130 such that the fields are not detected by the Hall effect sensor 110. If these magnetic fields are not controlled, then the Hall effect sensor 110 may detect the magnetic fields of the magnets 100, 130 instead of the magnetic field of the third magnetic source 140 and thereby fail to detect when the clasp 10 is not engaged. Accordingly, in order to control the magnetic field of the magnets 100, a first field controlling body 170 is provided behind the first set of magnets 100 in the housing part 20 of the clasp 10. The first field controlling body 170 may be made from a ferromagnetic material (high permeability material). In this embodiment, the field controlling body is made from steel. Accordingly, a flux path of the first set of magnets 100 is controlled such that the magnetic field produced by those magnets is kept away from the Hall effect sensor 110.

In this figure, it can also be seen that the channel 70 are splayed. That is, towards the middle of the housing 20, the channels 70 are narrower, while further away from the middle, the channels 70 widen. Such a configuration makes it easier for the buckle part 30 of the clasp 10 to be disengaged from the housing part 20 of the clasp 10 by a rotation in the first plane. As previously mentioned, such an operation may be unlikely to occur naturally and yet may be performed easily by a user with only one hand. Accordingly, a user may intentionally remove the wrist-worn device easily with limited risk that the wrist-worn device will pull free or accidentally come loose from the user's wrist.

Figure 5:
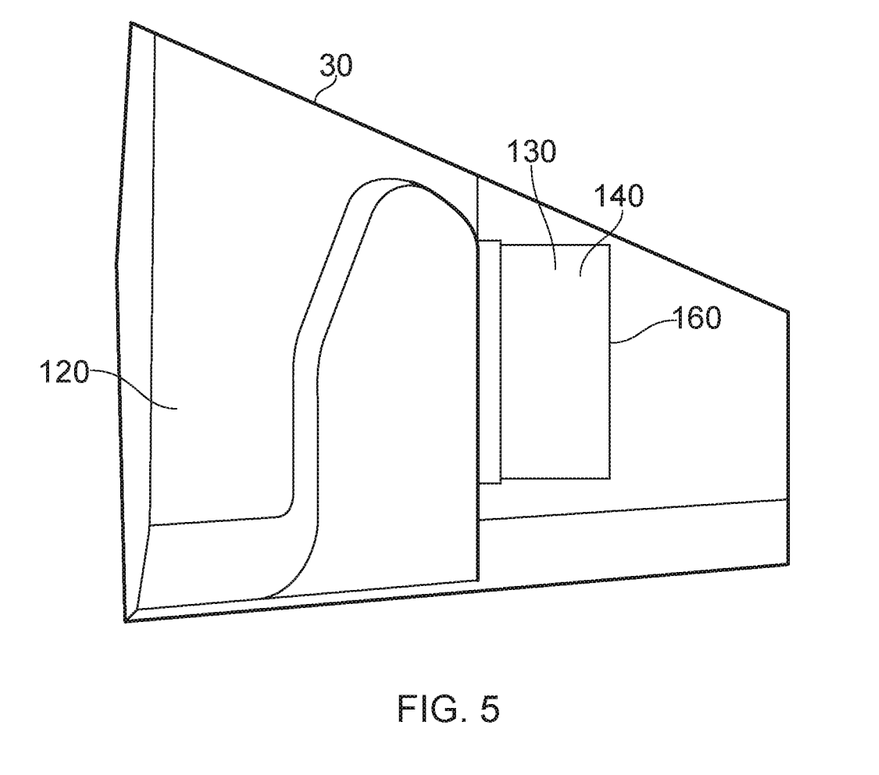
FIG. 5 shows a cross-section of the buckle part of the clasp according to one embodiment.

FIG. 5 shows a cross-sectional view of the buckle part 30 of the clasp 10 according to one embodiment.

As previously discussed, the buckle part 30 comprises protrusions 120, which are configured to be inserted into channels 70 of the housing part 20 of the clasp 10 in order to provide an interlocking mechanism.

The housing part 30 also comprises the second set of magnets 130, which is configured to be aligned with the first set of magnets 100 that form part of the housing part of the clasp 10 when the mechanical interlocking mechanism is engaged. Furthermore, the buckle part 30 of the last 10 comprises a magnetic source 140 which is configured to be sensed by the effect sensor 110 in the housing part 20 of the clasp 10 when the mechanical interlocking mechanism is engaged.

A second field controlling body 160 is provided behind the second set of magnets 130, such that a magnetic field of the second set of magnets 130 is controlled and thereby not detected by the Hall effect sensor 110 in the housing part 20 of the clasp 10.

Figure 6:
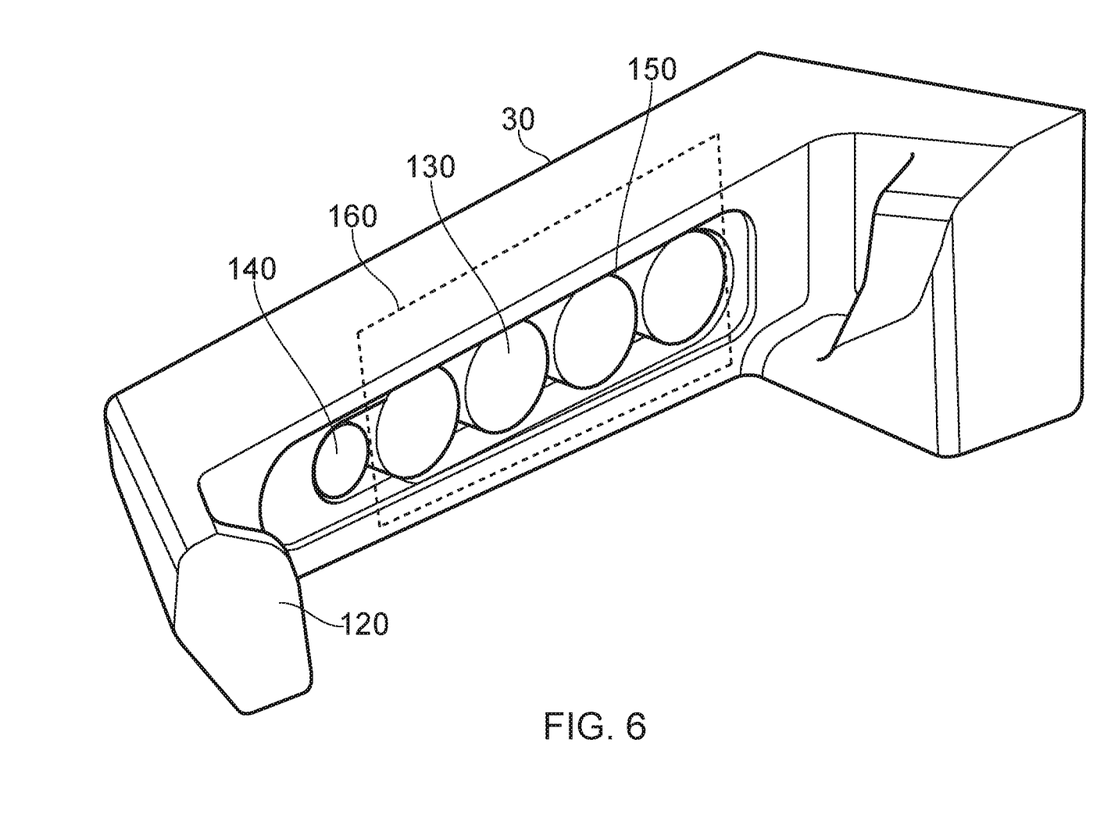
FIG. 6 shows an isometric view of the buckle part shown in FIG. 5.

FIG. 6 shows an isometric view of the buckle part 30 of the clasp 10.

The second set of magnets 130, together with a third magnetic source 140, are protected by a cover 150. The cover 150 protects the second set of magnets 130 and third magnetic source 140 from exposure as previously discussed.

A second field controlling body 160 is provided behind the second set of magnets 130 and thereby sets up a magnetic flux path for the second set of magnets 130. Consequently, a magnetic field of the second set of magnets 130 can be controlled such that the field is not detected by the Hall effect sensor 110, while still enabling the second set of magnets 130 to engage with the first set of magnets 100 that are in the housing part 20 of the clasp 10. As with the first field controlling body 170 in the housing part 20 of the clasp 10, the second field controlling body 160 may be made from a ferromagnetic material. In this example, the second field controlling body is made from steel.

Figure 7:
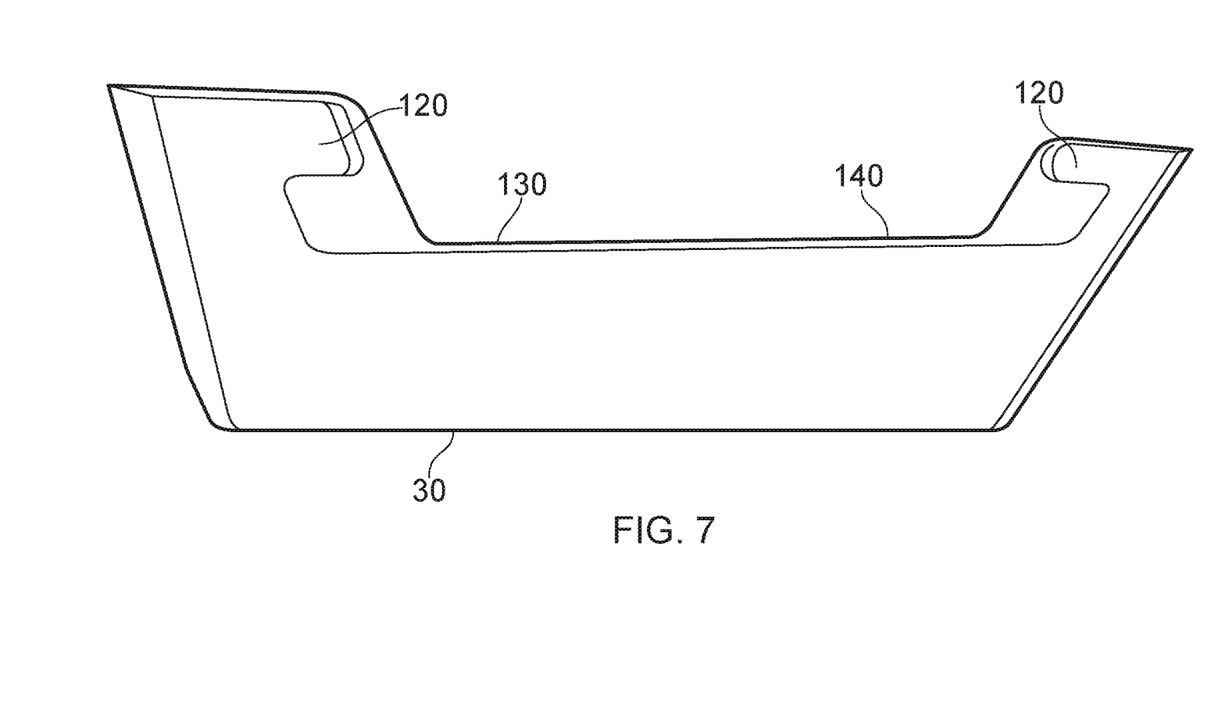
FIG. 7 shows the bottom of a buckle part shown in FIG. 5.

FIG. 7 shows an underside of the buckle part 30 of the clasp 10.

This figure shows the shape of the protrusions 120 that form part of the interlocking mechanism. In this embodiment, it can be seen that each of the two protrusions 120 are differently shaped. In particular, one of the protrusions is larger than the other protrusion. However, it will be appreciated that the protrusions may be identically shaped. It can also be seen, that the protrusions 120 have a generally rounded shape. This may make it easier for the protrusions 120 to be smoothly inserted into the channels 70 of the housing part 20 of the clasp 10.

Furthermore, although this embodiment shows a pair of protrusions 120 and a pair of channels 70, it will be appreciated that a similar effect can be achieved using any number of protrusions and channels, or any other mechanism that allows for a mechanical interlock as previously discussed to occur between the housing part 20 and the buckle part 30 of the clasp 10.

Figure 8:
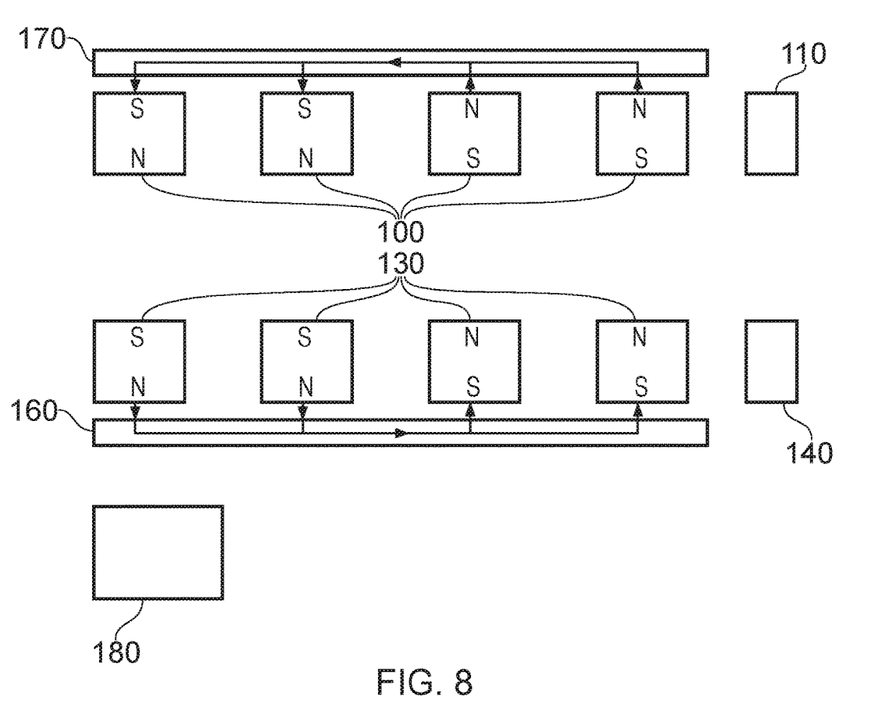
FIG. 8 shows the controlled flux path from magnets as a result of using first and second field controlling bodies.

FIG. 8 shows how first and second field controlling bodies 170, 160 are used to control a magnetic flux path of magnets 100, 130. In this embodiment, there are four magnets provided in the housing part 20 of the clasp 10 and a further four magnets provided in the buckle part 30 of the clasp 10. Magnets that face each other have opposite magnetic polarities and hence will attract each other. Furthermore, the first set of magnets 100 comprises two magnets of one polarity and two magnets of a second polarity. Similarly, the second set of magnets 130 comprise two magnets of the second polarity and two magnets of the first polarity. Without the field controlling bodies, the magnetic fields of magnets 100 and 130 may interfere with the magnetic sensor 110 and third magnetic source 140.

In this embodiment, the field controlling bodies are situated behind the magnets 100, 130. That is, the field controlling bodies are not placed between the magnets 100, 130. The first field controlling body 170 therefore creates a magnetic flux path in the first set of magnets 100 from north to south, as shown in FIG. 8. Accordingly, a magnetic field of the first set of magnets 100 is controlled and does not stray towards the magnetic sensor 110. Similarly, the second field controlling body 160 creates a different magnetic flux path in the magnets 130 from north to south. Again, the magnetic field of the second set of magnets 130 is therefore controlled and does not stray towards the magnetic sensor 110.

Accordingly, the magnetic sensor 110 detects only the magnetic field produced by the third magnetic source 140 and not the magnetic field produced by the magnets 100, 130. Furthermore, if there is another magnetically sensitive device 180 in the apparatus, such as a motor, it is unlikely to be affected by the magnetic fields of the magnets 100, 130, since those magnetic fields are constrained by the field controlling bodies 160, 170. The field controlling bodies 160, 170 are made of a high magnetic permeability material, e.g. steel.

Figure 9:
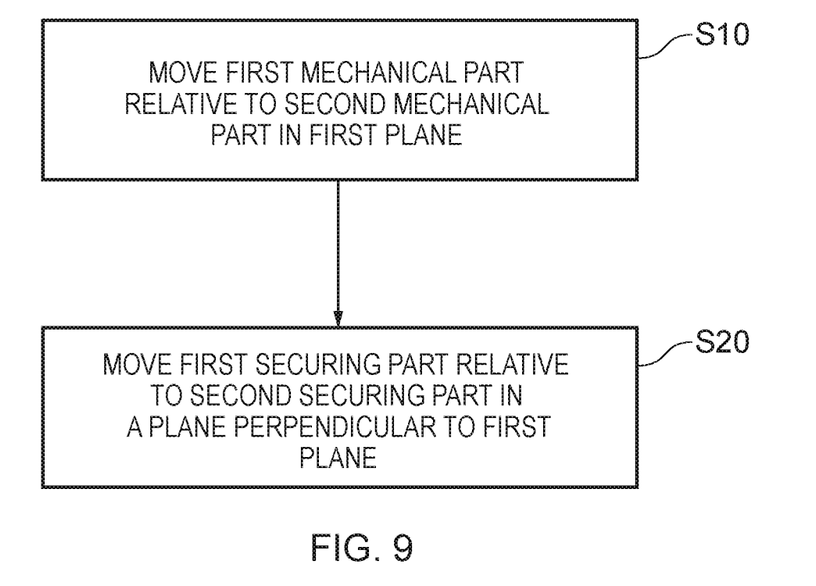
FIG. 9 shows, in flowchart form, a method of securing a strap of a wrist-worn device by use of a clasp.

FIG. 9 shows, in flowchart form, a method of securing a strap of a wrist-worn device by use of a clasp 10 that has a housing part 20 and a buckle part 30.

At step S10, a mechanical interlock is achieved by moving the buckle part 30 into the housing part 20. More specifically, protrusions 120 of the buckle part 30 are slid into channels 70 of a housing part 20. This motion occurs in a first plane 40. With the mechanical interlock engaged, motion in a plane 50 that is perpendicular to the first plane 40 is resisted.

At step S20, a securing step is performed in which one or more of a first set of magnets 100 in the housing part 20 of the clasp 10 are brought into engagement with a second set of magnets 130 on the buckle part 30 of the clasp 10.

Accordingly, the magnets 100, 130 inhibit separation of an interlocking mechanism by inhibiting motion parallel to a first plane 40. Meanwhile, the protrusions 120 and channels 70 make up the interlocking mechanism and inhibit separation of the magnets 100, 130 when there is tension in a plane 50, which is substantially perpendicular to the first plane 40.

Figure 10:
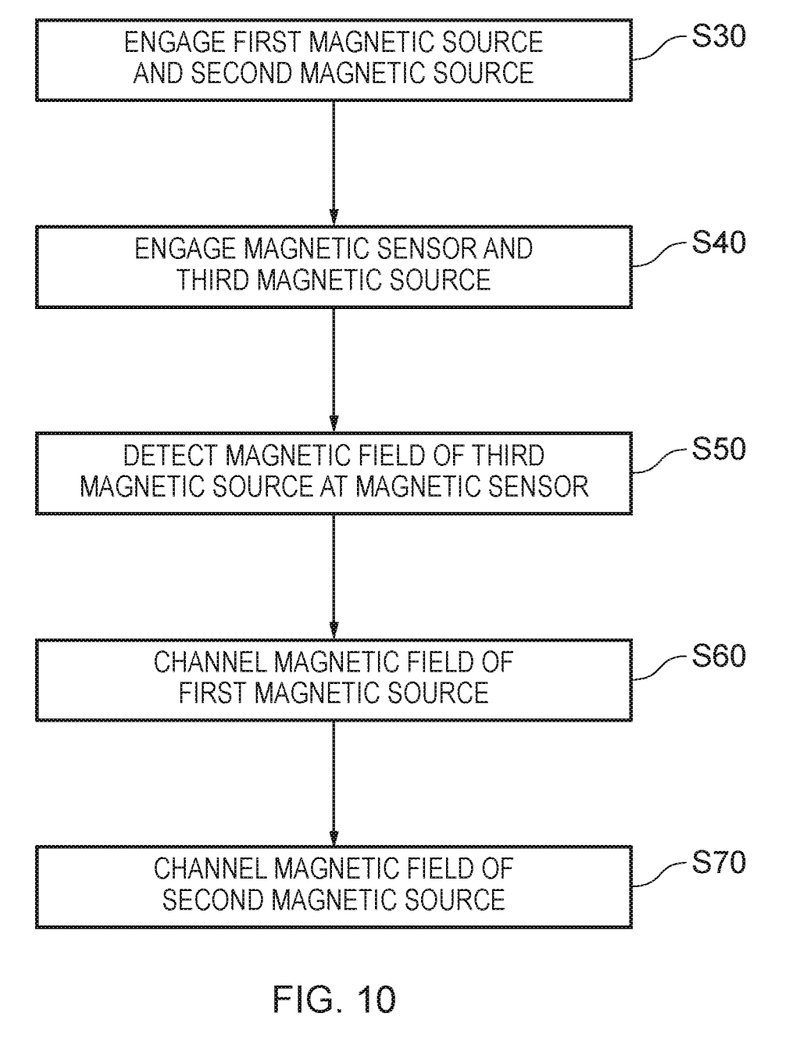
FIG. 10 shows, in flowchart form, a method of detecting the opening and closing of a clasp on a wrist-worn device.

FIG. 10 shows, in flowchart form, a method of detecting whether a first (housing) side 20 of the clasp 10 is connected to a second (buckle) side 30 of the clasp 10.

At step S30, a first set of magnets 100 in the housing part 20 of a clasp 10 are engaged with a second set of magnets 130 in the buckle part 30 of the clasp 10. Opposing regions of the magnets 100, 130 are opposite in magnetic polarity. Accordingly, the first set of magnets 100 and second set of magnets 130 are magnetically attracted to each other.

In step S40, a magnetic sensor 110 on the housing part 20 of the clasp 10 is engaged with a third magnetic source 140 on the buckle side 30 of the clasp 10.

At step S50, a magnetic field of the third magnetic source 140 is detected by the magnetic sensor 110. In particular, it is detected whether the magnetic field of the third magnetic source 140 at the magnetic sensor 110 is above a threshold or not. If the magnetic field is above the threshold, it is determined that the third magnetic source 140 is present, and therefore that clasp 10 is engaged. If the magnetic field is not above the threshold, then, it is determined that the third magnetic source 140 is not present and that the clasp 10 is not engaged.

At step S60, a magnetic field of the first set of magnets 100 in the housing part 20 is controlled such that a magnetic field of the first set of magnets 100 is below the threshold at the magnetic sensor 110. Accordingly, a magnetic field of the first set of magnets 100 is not detected by the magnetic sensor 110.

At step S70, a magnetic field of the second set of magnets 130 in the buckle part 30 is similarly controlled such that a magnetic field of the second set of magnets 130 is below the threshold at the magnetic sensor 110.

Accordingly, the magnetic securing mechanism of the clasp 10 operates correctly, while not interfering with the operation of the third magnetic source and magnetic sensor that can collectively be used to determine whether or not the clasp 10 is fastened.

The invention claimed is:

1. A wrist-worn device clasp configured to detect whether or not a first side and a second side of a clasp are connected, the clasp comprising:
   a magnetic securing mechanism comprising a first magnetic source on said first side and a second magnetic source on said second side, wherein said first magnetic source and second magnetic source are configured to engage with each other via a magnetic force and wherein opposing regions of said first magnetic source and said second magnetic source are opposite in magnetic polarity;
   a third magnetic source on said second side;
   a magnetic sensor on said first side and proximal to said magnetic securing mechanism, configured to engage with and detect whether a magnetic field of said third magnetic source at said magnetic sensor is above a threshold;
   a first field-controlling body having a high permeability and located on said first side, configured to channel a magnetic field of said first magnetic source such that a magnetic field of said first magnetic source at said magnetic sensor is below said threshold; and
   a second field-controlling body having a high permeability and located on said second side, configured to channel a magnetic field of said second magnetic source such that a magnetic field of said second magnetic source at said magnetic sensor is below said threshold.

2. A wrist-worn device clasp according to claim 1, wherein said magnetic sensor is a Hall effect sensor.

3. A wrist-worn device clasp according to claim 1, wherein at least one of said first field-controlling body and said second field-controlling body comprises a ferromagnetic material.

4. A wrist-worn device clasp according to claim 3, wherein at least one of said first field-controlling body and said second field-controlling body comprises steel.

5. A wrist-worn device comprising the wrist-worn device clasp according to claim 1, wherein responsive to said magnetic sensor detecting that said magnetic field of said third magnetic source at said magnetic sensor is below a threshold, said wrist-worn device is configured to switch said wrist-worn device from an authenticated state to an unauthenticated state.

6. A method of detecting whether or not a first side and a second side of a clasp for a wrist-worn device are connected, the clasp comprising:

a first engaging step of engaging a first magnetic source on said first side and a second magnetic source on said second side via a magnetic force, wherein opposing regions of said first magnetic source and said second magnetic source are opposite in magnetic polarity;
   a second engaging step of engaging a magnetic sensor on said first side, proximal to said second magnetic source, with a third magnetic source on said second side;
   a detection step of detecting whether or not a magnetic field of said third magnetic source at said magnetic sensor is above a threshold;
   a first channelling step of channelling a magnetic field of said first magnetic source such that a magnetic field of said first magnetic source at said magnetic sensor is below said threshold; and
   a second channelling step of channelling a magnetic field of said second magnetic source such that a magnetic field of said second magnetic source at said magnetic sensor is below said threshold.

7. A wrist-worn device clasp configured to detect whether or not a first side and a second side of a clasp are connected, the clasp comprising:
   a magnetic securing means for securing via a magnetic force, said magnetic securing means comprising a first magnetic means for providing a first magnetic field and a second magnetic means for providing a second magnetic field, wherein said first magnetic means is on said first side and said second magnetic means is on said second side and wherein said first magnetic means and second magnetic means are configured to engage with each other via said magnetic force and wherein opposing regions of said first magnetic means and said second magnetic means are opposite in magnetic polarity;
   a third magnetic means for providing a third magnetic field, wherein said third magnetic means is on said second side;
   a magnetic sensing means for engaging with and detecting whether a magnetic field of said third magnetic source at said magnetic sensor is above a threshold, wherein said magnetic sensing means is on said first side proximal to said magnetic securing mechanism;
   a first field-controlling means for channelling a magnetic field of said first magnetic source such that said magnetic field of said first magnetic source at said magnetic sensor is below said threshold, wherein said first field-controlling means is on said first side; and
   a second field-controlling means for channelling a magnetic field of said second magnetic source such that said magnetic field of said second magnetic source at said magnetic sensor is below said threshold, wherein said second field-controlling means is on said second side.

* * * * *